United States Patent [19]

Uehara

[11] Patent Number: 4,901,243

[45] Date of Patent: Feb. 13, 1990

[54] TIMER CONTROLLED POWER SUPPLY SYSTEM FOR A DATA TERMINAL

[75] Inventor: Kazuhiro Uehara, Yamatokoriyama, Japan

[73] Assignee: Sharp Kabushiki Kaisha, Osaka, Japan

[21] Appl. No.: 206,733

[22] Filed: Jun. 15, 1988

[30] Foreign Application Priority Data

Jun. 16, 1987 [JP] Japan ................... 62-150389

[51] Int. Cl.$^4$ .............................................. G05B 23/02
[52] U.S. Cl. .................................. 364/483; 340/825.8
[58] Field of Search ............... 323/241, 283, 322, 323; 340/825.08; 364/464.04, 483

[56] References Cited

U.S. PATENT DOCUMENTS

| 3,990,000 | 11/1976 | Digneffe | 323/322 |
|---|---|---|---|
| 4,090,107 | 5/1978 | Seib | 323/322 |
| 4,121,149 | 10/1978 | Seltzer | 323/323 |
| 4,538,231 | 8/1985 | Abe et al. | 323/283 |
| 4,591,781 | 5/1986 | Larson | 323/323 |
| 4,683,531 | 7/1987 | Kelch et al. | 340/828.08 |
| 4,687,985 | 8/1987 | Pitel | 323/323 |
| 4,713,601 | 12/1987 | Zahm et al. | 323/322 |

FOREIGN PATENT DOCUMENTS 56-54590  5/1981  Japan .

Primary Examiner—Patrick R. Salce
Assistant Examiner—Jeffrey Sterrett
Attorney, Agent, or Firm—Birch, Stewart, Kolasch & Birch

[57] ABSTRACT

A power source control system for controlling a power source of a terminal device, including a timer in which an actuation time is preset and a control circuit which receives a signal from the timer. At the actuation time, the timer outputs the signal to the control circuit such that the control circuit performs on-off control of the power source of the terminal device.

9 Claims, 3 Drawing Sheets

TIMER CONTROLLED POWER SUPPLY SYSTEM FOR A DATA TERMINAL

BACKGROUND OF THE INVENTION

The present invention relates to a system for performing on-off control of a power source of a terminal device at a preset time.

At present, point-of-sales (POS) systems are employed in department stores, supermarkets, etc. The POS system is constituted by one or a plurality of terminal devices such as one or a plurality of electronic cash registers provided at counters and a host apparatus having, for example, the same configuration as that of the terminal devices, to which the terminal devices are connected. When sale of commodities has been made at each of the terminal devices, inputted names, quantities, unit prices, a total price, etc. of the commodities are immediately transmitted to the host apparatus.

However, data which cannot be transmitted from the terminal devices to the host apparatus at the time of sales, for example, gross sales of one day may be transmitted to the host apparatus after closing of the shop at night. Thus, in the POS system, such a necessity arises frequently that the terminal devices are operated at night.

Two methods have been so far employed for controlling power sources of the terminal devices prior to use of the terminal devices. In one method, power source switches of the terminal devices are operated manually. In the other method, the power sources of the terminal devices are controlled in response to reception of a transmission signal outputted by the host apparatus, etc. Thus, conventionally, in the case where data transmission is performed between the host apparatus and the unattended terminal devices at night, the following two power source control methods can be employed. In one known power source control method, the power sources of the terminal devices are kept in the ON state at all times. In this known method, although data transmission from the terminal devices to the host apparatus can be started immediately, the power sources are in the ON state not only at the time of data transmission but also when the terminal devices are not in use, thereby resulting in waste of power consumption.

Meanwhile, in the other known power source control method, the power sources of the terminal devices are turned on in response to reception of an ON signal for turning on the power sources of the terminal devices, which ON signal is outputted by the host apparatus, etc. However, this prior art method has such a drawback that since the terminal devices perform reading of a transmitted program, etc. after turning on of the power sources, a long time period elapses from transmission of the ON signal by the host apparatus, etc. to actual start of data transmission.

SUMMARY OF THE INVENTION

Accordingly, an essential object of the present invention is to provide a power source control system for controlling power sources of terminal devices, by which the terminal devices can be operated immediately at a desired time through restriction of waste of power consumption, with substantial elimination of the disadvantages inherent in conventional power source control systems of this kind.

In order to accomplish this object of the present invention, a power source control system for controlling a power source of a terminal device, embodying the present invention comprises a timer means in which an actuation time is preset; and a power source control circuit which receives a signal from said timer means; said timer means outputting said signal to said power source control circuit at the actuation time such that said power source control circuit performs on-off control of said power source of said terminal device.

In the power source control system of the present invention, the timer means outputs the signal at the preset time and the power source control circuit, in response to reception of the signal, turns on and off the power source of the terminal device through control of a relay, etc.

Therefore, in accordance with the present invention, by setting the power source control system such that the power source is turned on at a time preceding a time of start of data transmission by a time period required for reading the transmitted program, etc. and by turning off the power source upon completion of data transmission, the power source of the terminal device can be controlled without not only wasteful power consumption but a waiting time for starting data transmission.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
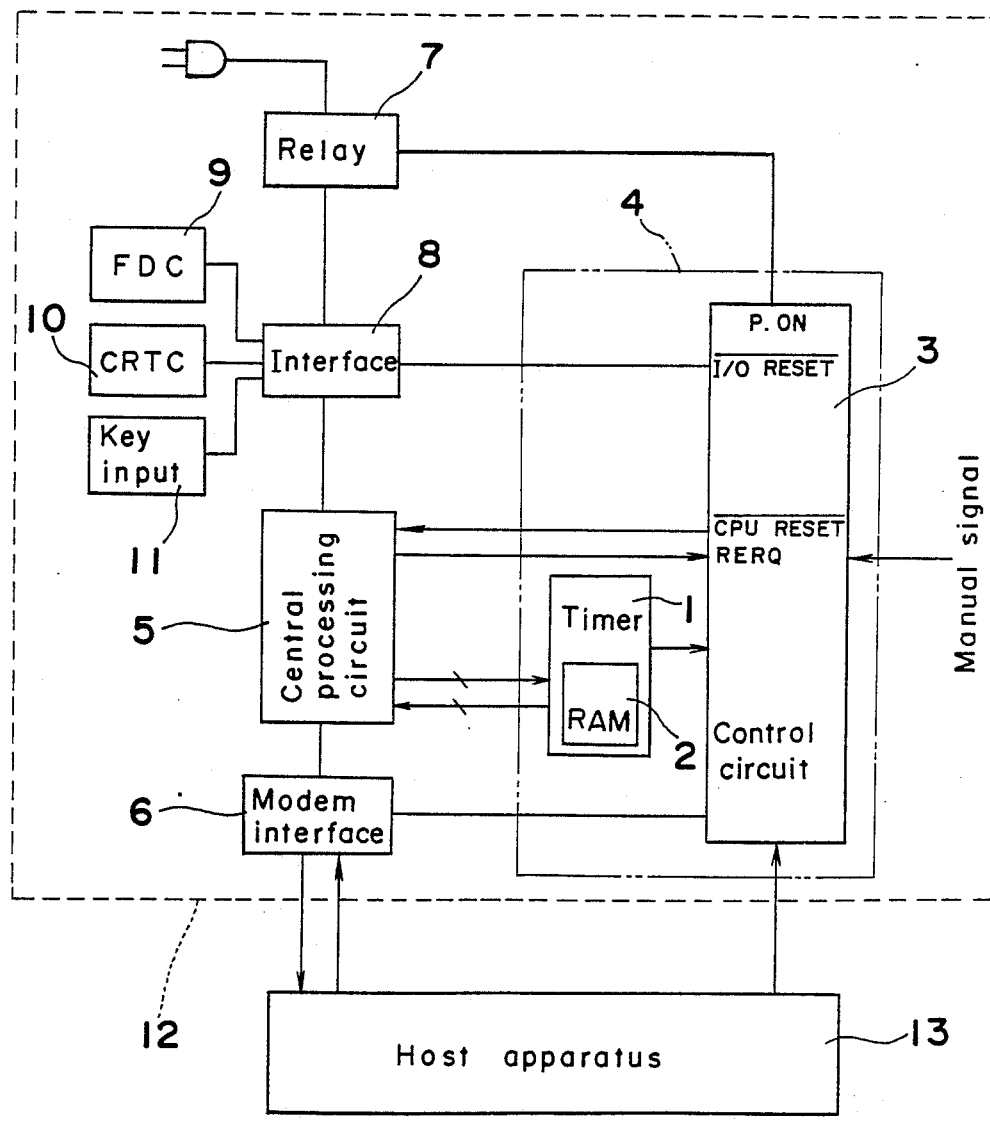
FIG. 1 is a block diagram showing a terminal device including a power source control device according to one embodiment of the present invention.

Referring now to the drawings, there is shown in FIG. 1, a terminal device 12 connected to a host apparatus 13. The terminal device 12 is enclosed by broken lines in FIG. 1 and includes a power source control device 4 for performing on-off control of a power source of the terminal device 12, according to one embodiment for the present invention. An output voltage of the power source of the terminal device 12 is supplied, through a relay 7, to input-output devices such as a floppy disk control circuit (FDC) 9, a display unit control circuit (CRTC) 10 and a key input portion 11 and a central processing circuit 5, etc. The central processing circuit 5 is connected, via an interface 8, to the input-output devices such as the FDC 9, the CRTC 10 an the key input portion 11. Data transmission is performed between the central processing circuit 5 and the host apparatus 13 through a modem interface 6. In the same manner as in a prior art control circuit, a control circuit 3 receives a manual signal and a signal for turning on the power source of the terminal device 12, which is delivered form the host apparatus 13, etc., so as to turn on and off the power source of the terminal device 12 by, for example, changing the output voltage applied to the relay 7.

In this embodiment, the power source control device 4 includes not only the control circuit 3 but a timer 1 and thus, also controls the power source in accordance with an output signal of the timer 1 in addition to the above described function of the prior art control circuit.

The timer 1 incorporates a memory for storing data indicative of a present time, etc., for example, a random access memory (RAM) 2. Data transfer is performed between the timer 1 and the central processing circuit 5 through a data bus. The control circuit 3 not only outputs the signal to the relay 7 but performs the following functions associated with control of the power source. Namely, when a signal requesting resetting has been inputted from the central processing circuit 5 to the control circuit 3 at the time of depression of a resetting switch (not shown) and turning off of the power source, the control circuit 3 outputs a resetting signal for resetting the central processing circuit 5 and the input-output devices such as the FDC 9, CRTC 10, etc. Meanwhile, when the power source has been turned on, the control circuit 3 outputs a signal for activating the modem interface 6.

Figure 2:
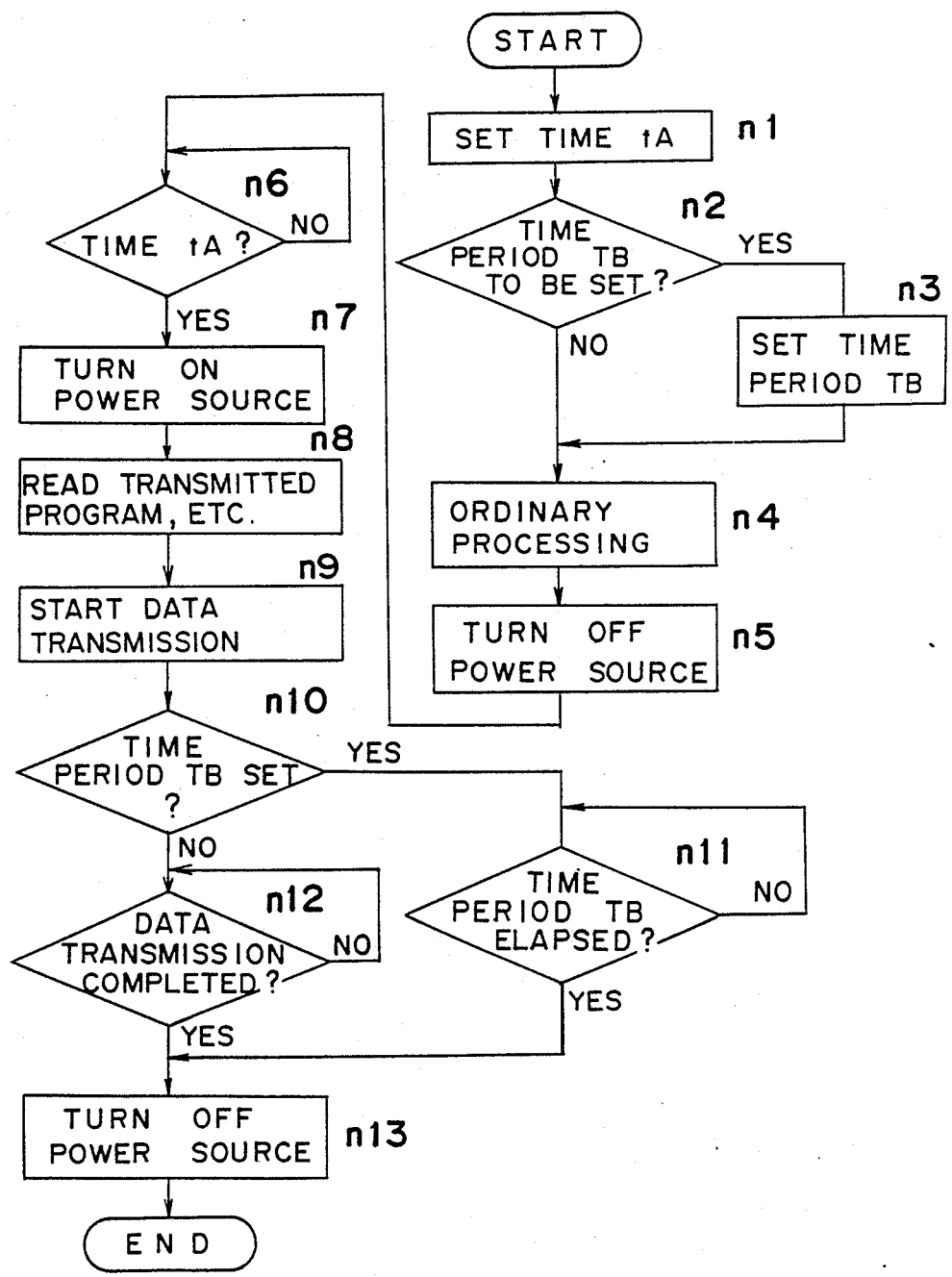
FIG. 2 is a flow chart showing operational sequences of the power source control device of FIG. 1.

Hereinbelow, operation of the power source control device 4 is described with reference to a flow chart of FIG. 2. At step n1, a time tA for turning on the power source is inputted from the key input portion 11, etc. Then, if it is found at step n2 that a time for turning off the power source should be set, the program flow proceeds to step n3 at which a time period TB from the time tA for turning on the power source to the time for turning off the power source is set. The data indicative of the time tA and the time period TB are stored in the RAM 2 of the timer 1 through the interface 8 and the central processing circuit 5. For example, it is assumed here in a POS system that the power source is turned on at 22 o'clock 50 min. and reading of a transmitted program, etc. are finished in 10 min. such that sales data are transmitted at night for one hour from 23 o'clock. At this time "22:50" and "1:10" are inputted as the time tA and the time period TB to the key input portion 11, respectively. Subsequently, at step n4, various ordinary processings during business hours are performed. Then, at step n5, the power source is turned off, for example, at the time of closing of the shop. Even if the power source of the terminal device 12 is turned off, the power source control device 4 is backed up by an auxiliary power source (not shown) so as to continue functioning normally.

If it is found at step n6 that it is the time tA (22 o'clock 50 min.), the program flow proceeds to step n7 at which a signal is outputted from the timer 1 to the control circuit 3. When the signal has been inputted to the control circuit 3, a voltage of a terminal of the control circuit 3, which terminal is connected to the relay 7, is raised in the control circuit 3. The relay 7 is actuated so as to turn on the power source when the voltage of the terminal of the control circuit 3 has exceeded a predetermined voltage.

Figure 3:
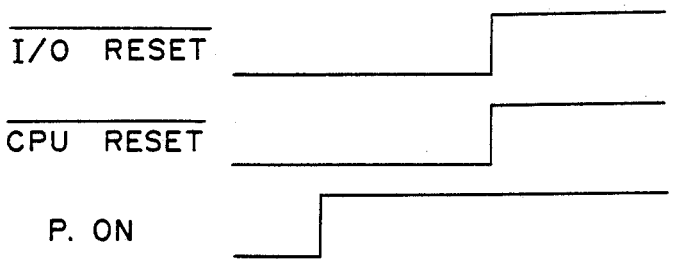
FIG. 3 is a time chart showing voltages of terminals of a control circuit employed in the power source control device of FIG. 1 at the time of turning on of the power source.

FIG. 3 shows wave forms of output voltages of terminals $\overline{I/O\ RESET}$, $\overline{CPPU\ RESET}$ and P.ON of the control circuit 3 at the time of turning on of the power source. At the time of turning on of the power source, the control circuit 3 delivers the resetting signal to the interface 8 and the central processing circuit 5 so as to initialize the input-output devices such as the FDC 9, the CRTC 10 and the key input portion 11 and the central processing circuit 5.

Upon completion of the above described initialization, the program flow proceeds to step n8 at which the terminal device 12 reads the transmitted program from an external storage (not shown), for example, a floppy disk. Upon lapse of 10 min., the terminal devices 12 is set to a state enabling data transmission. Thereafter, at step n9, transmission of sales data, etc. from the terminal device 12 to the host apparatus 13 is started.

A decision is made at step n10 as to whether or not the time period TB from the time tA to the time for turning off the power source has been set. In the case of "YES" at step n10, it is decided at step n11 whether or not the time period TB has elapsed from the time tA. In the case of "YES" at step n11, the program flow proceeds to step n13 at which the power source is turned off. On the other hand, even in the case of "NO" at step n10, it is decided at step n12 whether or not transmission of the sales data, etc. has been completed. In the case of "YES" at step n12, a command for turning off the power source is delivered from the central processing circuit 5 to the power source control device 4 and thus, the program flow proceeds to step n13 such that the power source is turned off.

Figure 4:
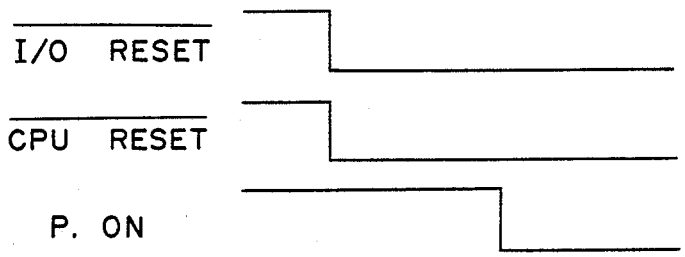
FIG. 4 is a time chart showing voltages of the terminals of FIG. 3 at the time of turning off of the power source, respectively.

FIG. 4 shows wave forms of output voltages of the terminals $\overline{I/O\ RESET}$, $\overline{CPU\ RESET}$ and P.ON of the control circuit 3 at the time of turning off of the power source. In response to the signal requesting resetting from the central processing circuit 5, the control circuit 3 transmits the resetting signal to the interface 8 and the central processing circuit 5 so as to reset all the devices of the terminal device 12.

As described above, data transmission between the terminal device 12 and the host apparatus 13 at night can be performed without such a need that the power source of the terminal device 12 be kept in the ON state even if the terminal device 12 is unattended or that a signal for turning on the power source of the terminal device 12 is transmitted from the host apparatus 13, etc. to the terminal device 12. Therefore, for data transmission, waste of power consumption is avoided and a waiting time from output of the signal for turning on the power source to start of data transmission is eliminated.

Meanwhile, since the power source control device 4 can be formed by one chip, the present invention can be achieved easily and power consumption for backup by the auxiliary power source is minute. Furthermore, since the power source control device 4 can be communicated with the central processing circuit 5 through the data bus, various commands, for example, a command for displaying the present time can be stored in the power source control device 4.

As is clear from the foregoing description, in accordance with the present invention, wasteful power consumption can be restricted and the terminal device can be immediately set to an operatable state at a desired time. Accordingly, for example, in the case where the terminal device is operated from a fixed time at night, the terminal device can be operated without the need for keeping the power source of the terminal device in the ON state with a consequent wasteful power consumption or delivering an external signal for turning on the power source so as to wait for an operational state of the terminal device. Thus, the arrangement of the present invention including the terminal device achieves improvement of operational efficiency and saving in energy consumption.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A power source control system for activating a data terminal device at a predetermined time for transmitting data to a host apparatus, comprising:
   controlled means for supplying electrical power to said data terminal device;
   a power source control device in said data terminal device and including a control circuit for energizing said controlled means and a timer having a memory for activating said control circuit in response to a preset time;
   means on said data terminal device for selecting a predetermined activation time;
   central processor means on said data terminal device for communicating with said power source control device, setting said activation time in said memory, and for transmitting data to said host apparatus when said control circuit of said power source control device is activated; and
   an interface circuit coupled between said central processor means and said host apparatus and being activated by said control circuit to transmit data to said host apparatus.

2. The system as defined by claim 1 and additionally including another interface circuit coupled between said central processing circuit and said means for selecting a predetermined activation time.

3. The system as defined by claim 2 wherein said means for selecting a predetermined time comprises a key input device.

4. The system as defined by claim 3 and additionally including a floppy disk control circuit coupled to said central processing circuit via said another interface circuit.

5. The system as defined by claim 3 and additionally including a display unit control circuit means coupled to said central processing circuit via said another interface circuit.

6. The system as defined by claim 1 wherein said interface circuit coupled between said central processor means and said host apparatus comprises a modem.

7. The system as defined by claim 1 wherein said memory comprises a random access memory and additionally including a data bus coupled between said random access memory and said central processing circuit.

8. The system as defined by claim 7 wherein said control circuit and said random access memory are included on a single chip.

9. The system as defined by claim 1 wherein said controlled means for supplying electrical power to said data terminal device comprises a relay.

* * * * *